(12) United States Patent
Ito et al.

(10) Patent No.: US 10,442,345 B2
(45) Date of Patent: Oct. 15, 2019

(54) VEHICULAR LAMP AND LIGHT SOURCE UNIT

(71) Applicant: Koito Manufacturing Co., Ltd., Tokyo (JP)

(72) Inventors: Makoto Ito, Shizuoka (JP); Takayuki Machida, Shizuoka (JP); Masaki Izawa, Shizuoka (JP); Masayoshi Kuroda, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 180 days.

(21) Appl. No.: 14/681,393

(22) Filed: Apr. 8, 2015

(65) Prior Publication Data
US 2015/0298599 A1    Oct. 22, 2015

(30) Foreign Application Priority Data

Apr. 17, 2014    (JP) .................................. 2014-085650

(51) Int. Cl.
*B60Q 1/26* (2006.01)
*F21S 43/30* (2018.01)
(Continued)

(52) U.S. Cl.
CPC ......... *B60Q 1/2696* (2013.01); *B60Q 1/0052* (2013.01); *B60Q 1/0088* (2013.01);
(Continued)

(58) Field of Classification Search
None
See application file for complete search history.

(56) References Cited

U.S. PATENT DOCUMENTS 6,431,728 B1 *  8/2002  Fredericks ........... B60Q 1/2696
                                                              340/901
2003/0147253 A1    8/2003  Shy
(Continued)

FOREIGN PATENT DOCUMENTS

CN    101873762 A    10/2010
CN    103486554 A    1/2014
(Continued)

OTHER PUBLICATIONS

An Office Action dated Dec. 20, 2016, issued from the Chinese State Intellectual Property Office of the P.R.C (SIPO) of Chinese Patent Application No. 201510184054.2 and a EN translation thereof.

*Primary Examiner* — Sharon E Payne
(74) *Attorney, Agent, or Firm* — Abelman, Frayne & Schwab

(57) ABSTRACT

Disclosed is a vehicular lamp including a light source unit equipped with a plurality of LEDs having different optical axes; and a reflector configured to reflect light emitted from the plurality of LEDs. The light source unit includes a base including a plurality of board mounting surfaces, in which the base is formed to be foldable around an axis formed between each two adjacent board mounting surfaces as a boundary; and a plurality of printed circuit boards attached to the plurality of board mounting surfaces, respectively, in which each printed circuit board has a light source mounted on a surface opposite to the board mounting surface thereof.

13 Claims, 6 Drawing Sheets

(51) Int. Cl.
*F21S 43/14* (2018.01)
*F21S 43/19* (2018.01)
*B60Q 1/00* (2006.01)

(52) U.S. Cl.
CPC ............ *B60Q 1/2607* (2013.01); *F21S 43/14* (2018.01); *F21S 43/19* (2018.01); *F21S 43/195* (2018.01); *F21S 43/30* (2018.01)

(56) References Cited

U.S. PATENT DOCUMENTS

2012/0287614 A1* 11/2012 Kajiya .................... H05K 1/147
 362/184
2013/0077334 A1* 3/2013 Otsubo ................. F21S 48/215
 362/509
2013/0170013 A1* 7/2013 Tonar ..................... B60R 1/088
 359/296

FOREIGN PATENT DOCUMENTS

| CN | 103649634 A | 3/2014 |
|---|---|---|
| JP | 2005-150036 A | 6/2005 |

* cited by examiner

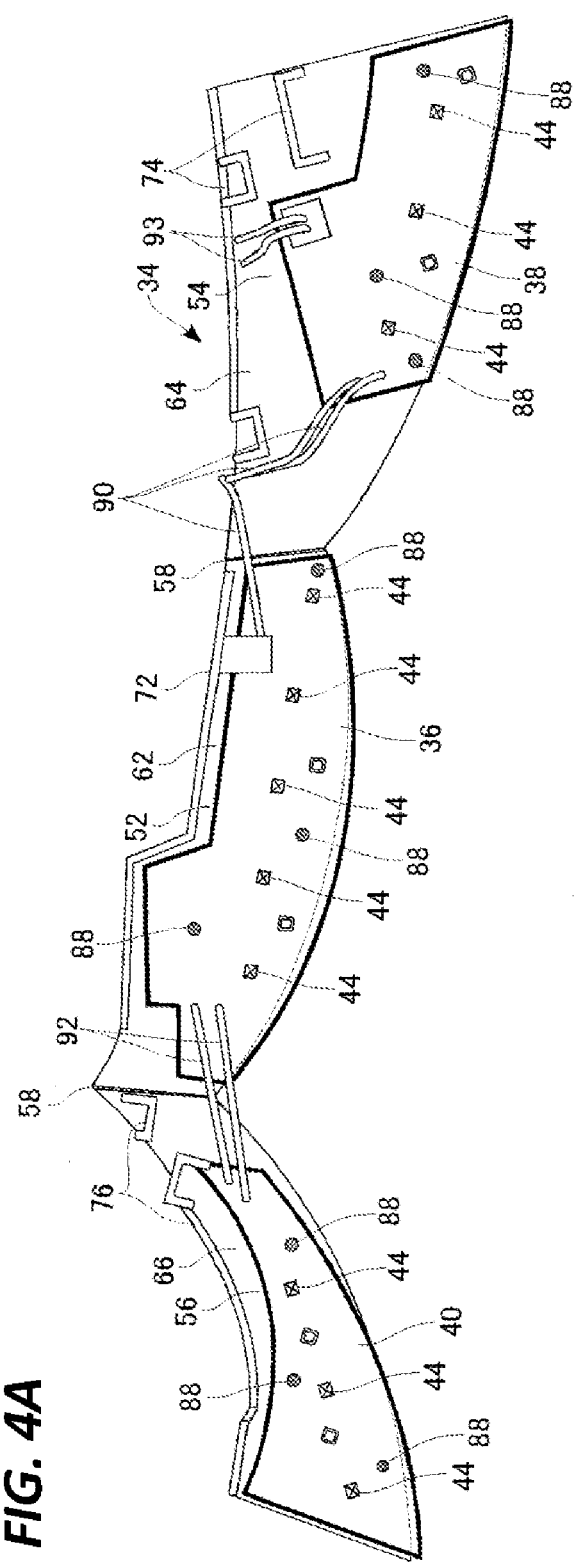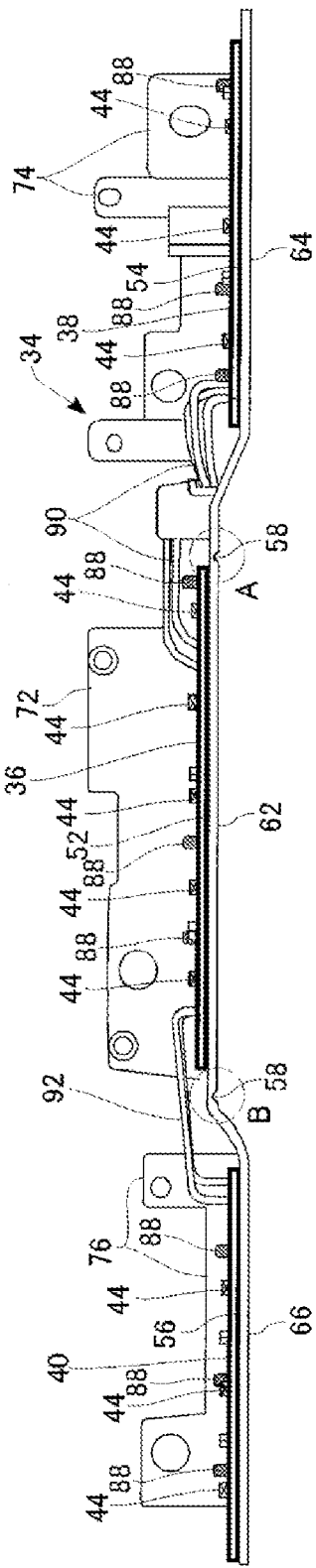

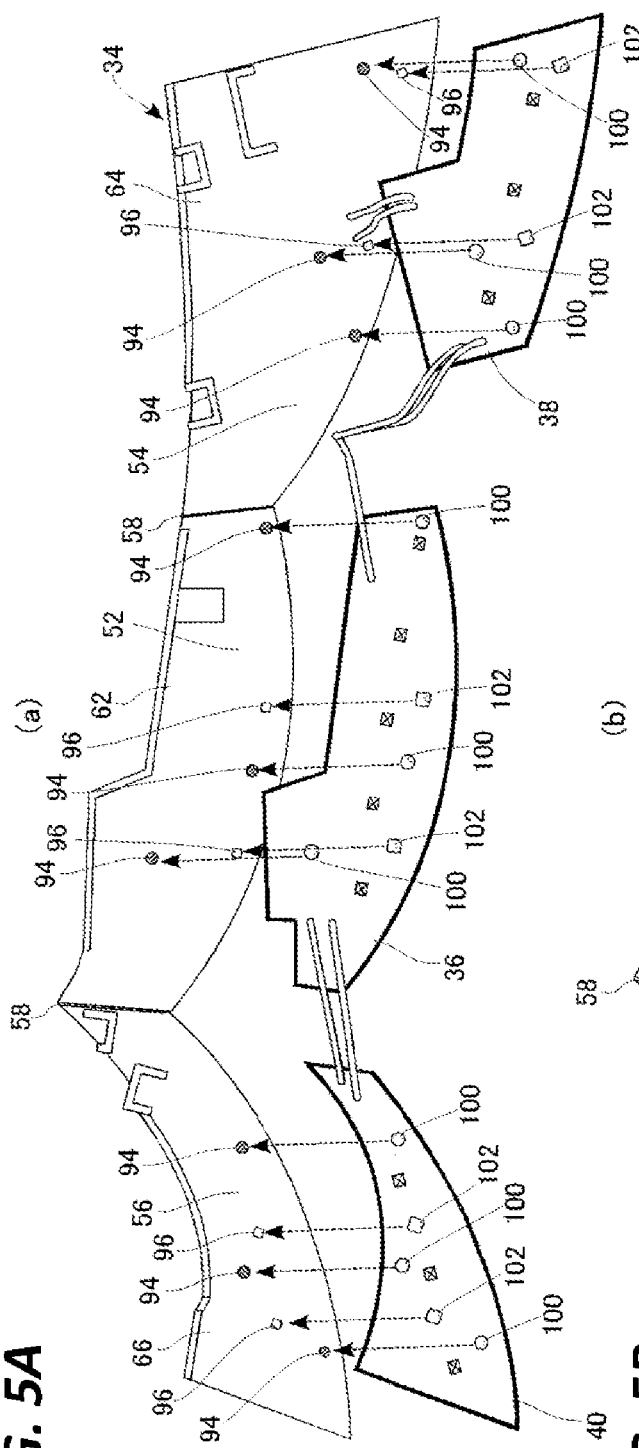

VEHICULAR LAMP AND LIGHT SOURCE UNIT

CROSS-REFERENCE TO RELATED APPLICATIONS

This application is based on and claims priority from Japanese Patent Application No. 2014-085650, filed on Apr. 17, 2014, with the Japan Patent Office, the disclosure of which is incorporated herein in its entirety by reference.

TECHNICAL FIELD

The disclosure relates to a vehicular lamp, and particularly to a structure of a light source unit.

BACKGROUND

A design has recently been considered important even in a vehicular lamp. A light source can be miniaturized by employing, for example, an LED. Thus, when a plurality of light sources are disposed within a lamp chamber so that their optical axes intersect and thus, light emitted from the plurality of light sources is reflected from a plurality of reflective surfaces provided within the lamp chamber, a variation may be provided in the arrangement or angle of the lamp and the decorative effect of the lamp may be improved.

When the plurality of light sources is disposed as described above, a support structure is required to dispose the light sources at designed positions and directions. As for the support structure, Japanese Patent Laid-Open Publication No. 2005-150036 discloses a structure in which, for example, a plurality of mounting boards corresponding to directions of the light sources is provided, and the respective mounting boards are supported by predetermined support members at different angles, respectively. The mounting boards may be provided at proper positions and proper angles with respect to a lamp body to exhibit the above described functions.

SUMMARY

However, when the configuration disclosed in Japanese Patent Laid-Open Publication No. 2005-150036 is employed, it is required to sequentially and individually fix the plurality of mounting boards with respect to the lamp body. Also, in order to ensure that a designed function is exhibited with high accuracy, relative positioning among the fixed mounting boards is required. Thus, there is room for improvement in view of workability.

The present disclosure has been made in view of the foregoing circumstances, and an object of the present disclosure is to improve workability when a plurality of light sources having different optical axis directions is provided within a lamp chamber.

In order to solve the problems described above, an aspect of the present disclosure provides a light source unit which is built in a vehicular lamp. The light source unit includes a base including a plurality of board mounting surfaces, in which the base is formed to be foldable around an axis formed between each two adjacent board mounting surfaces as a boundary; and a plurality of printed circuit boards attached to the plurality of board mounting surfaces, respectively, in which each printed circuit board has a light source mounted on a surface opposite to the board mounting surface thereof.

According to the present aspect, the relative angles among the board mounting surfaces may be varied only by performing a simple operation of folding the base around the axes. Therefore, the optical axis directions of the plurality of light sources may be different from each other only by attaching the plurality of printed circuit boards to the plurality of board mounting surfaces, respectively. In the folding, the positional relationship of each of the board mounting surfaces with respect to the axis is autonomously maintained, and thus, the workability is remarkably improved as compared to a case where a board mounting surface is separately provided. When the arrangement of the light sources in the plurality of board mounting surfaces, and the positions and directions of the axes among the board mounting surfaces are determined in advance, the positional relationship of the plurality of light sources may be set with high accuracy when the base is folded. The plurality of light sources may be provided within the lamp chamber at the designed position relationship as the light source unit is built the vehicular lamp.

The plurality of board mounting surfaces may be formed on one surface of the base, and the plurality of printed circuit boards may be fixed to the board mounting surfaces, respectively, which correspond to the plurality of printed circuit boards in a state where the base is developed before folding. According to this aspect, in the state where the base is developed, the plurality of printed circuit boards may be mounted on the corresponding board mounting surfaces through a processing such as, for example, thermal caulking in one direction. Thus, the plurality of printed circuit boards may be simply assembled through a single processing, and the fixing thereof may be easily performed. After the printed circuit boards are fixed, the base is folded so that positions among the plurality of light sources may be simply adjusted. Especially, when the folded base becomes compact, it is supposed that the printed circuit boards may be difficult to assemble after the base is folded. In this regard, in the present aspect, since the printed circuit boards are assembled in the state where the base is developed, the printed circuit boards may be assembled without any difficulty even in such a case.

The base may be obtained by integrally molding a resin material, and the axis may be formed of a thin portion formed in the base. According to this aspect, since the axis which is a main component for achieving the function described above may be simply formed, the manufacturing cost of the base in its entirety may be reduced.

Another aspect of the present disclosure provides a vehicular lamp. The vehicular lamp includes: a light source unit equipped with a plurality of light sources having different optical axes; and a reflector configured to reflect light emitted from the plurality of light sources. The light source unit includes: a base including a plurality of board mounting surfaces, in which the base is formed to be foldable around an axis formed between each two adjacent board mounting surfaces as a boundary; and a plurality of printed circuit boards attached to the plurality of board mounting surfaces, respectively, in which each printed circuit board has a light source mounted on a surface opposite to the board mounting surface thereof.

According to the present aspect, the relative angles among the board mounting surfaces may be varied only by performing a simple operation of folding the base around the axes in a step of fabricating the light source unit. Therefore, the optical axis directions of the plurality of light sources may be different from each other only by attaching the plurality of printed circuit boards to the plurality of board mounting surfaces, respectively. In the folding of the base, the positional relationship of each of the board mounting surfaces with respect to the axis is autonomously maintained, and thus, the workability is remarkably improved as compared to a case where board mounting surfaces are separately provided. When the arrangement of the light sources in the plurality of board mounting surfaces, and the positions and directions of the axes between each two adjacent board mounting surfaces are determined in advance, the positional relationship of the plurality of light sources may be set with high accuracy when the base is folded. When the light source unit is built in the vehicular lamp, the light emitted from each of the plurality of light sources may be reflected by the reflector so that the designed function may be achieved.

The light source unit and the reflector may be accommodated in a lamp chamber defined between a lamp body and an outer lens, and the base may be disposed along a periphery of the lamp chamber in a state where the base is folded. According to the present aspect, the folded shape of the base may be effectively utilized so that the plurality of printed circuit boards may be arranged at different angles along the periphery of the lamp chamber. Accordingly, by varying the directions of the optical axes of the plurality of light sources, the light may be emitted toward the reflector positioned in the inside or outside.

In this case, a mounting space of a lamp to be provided separately from the light source unit may be formed in a space surrounded by the base. According to the present aspect, a lamp may be disposed at the center of the lamp chamber to exert one function, and the plurality of light sources arranged along the periphery of the lamp chamber may exert the other function. For example, the central lamp may serve as a main light source which emits light toward the outside of the outer lens, and the plurality of light sources at the periphery may serve as auxiliary light sources for decoration.

Meanwhile, optionally combining the aforementioned components, or exchanging expressions of the present disclosure among, for example, a method, an apparatus, and a system, is also effective as an embodiment of the present disclosure.

According to the present disclosure, the workability may be improved when a plurality of light sources having different optical axis directions is provided in a lamp chamber.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIGS. 4A and 4B are views illustrating an assembly structure of a base with printed circuit boards.

FIGS. 5A and 5B are explanatory views illustrating a method of assembling a light source unit.

DETAILED DESCRIPTION

Figure 1:
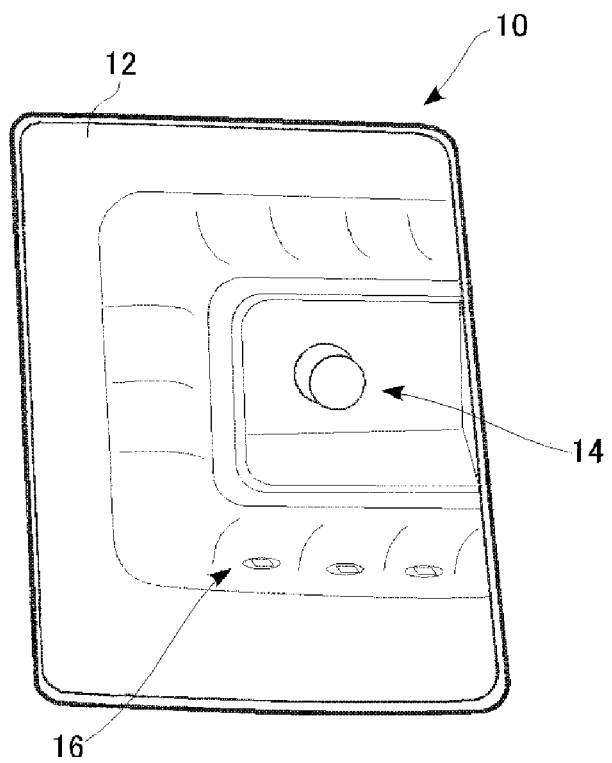
FIG. 1 is a perspective view illustrating an appearance of a vehicular lamp according to an exemplary embodiment.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

Hereinafter, an exemplary embodiment of the present disclosure will be described in detail with reference to the accompanying drawings. The same or equivalent components illustrated in the drawings are given the same reference numerals, and redundant descriptions will be properly omitted. Meanwhile, a vehicular lamp to be described below is a rear combination lamp including a tail/stop lamp and a turn lamp, as an example, but may be a head lamp or another lamp.

FIG. 1 is a perspective view illustrating an appearance of a vehicular lamp according to an exemplary embodiment. A vehicular lamp 10 includes a turn lamp 14 and a tail/stop lamp 16 provided within an outer lens 12. The turn lamp 14 is provided at the center of the vehicular lamp 10, and the tail/stop lamp 16 is provided around the turn lamp 14. The turn lamp 14 is constituted by one discharge lamp bulb, and the tail/stop lamp 16 is constituted by a plurality of LEDs.

Figure 2:
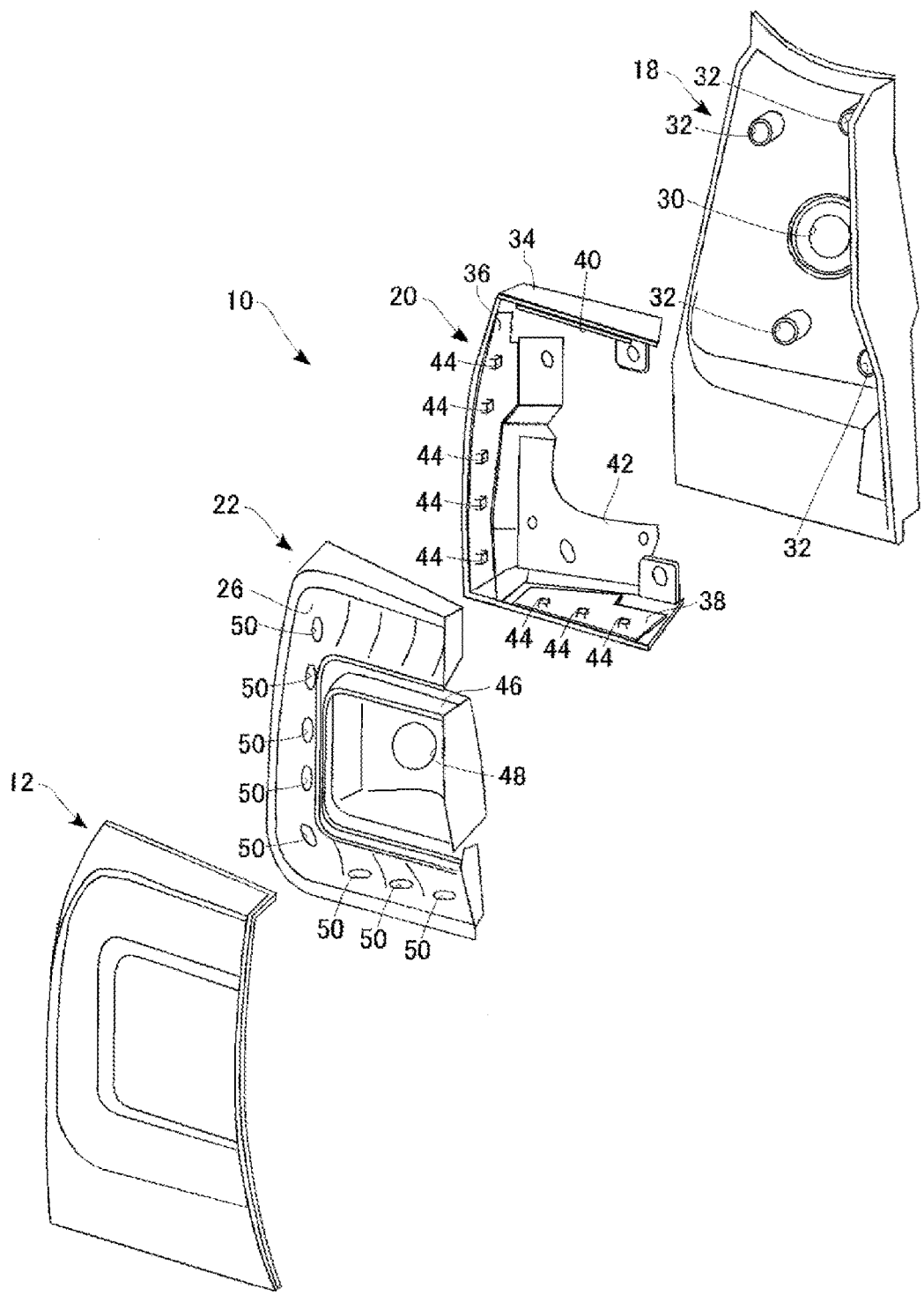
FIG. 2 is an exploded perspective view illustrating main components of the vehicular lamp.

FIG. 2 is an exploded perspective view illustrating main components of the vehicular lamp. The vehicular lamp 10 is configured by assembling a light source unit 20, an extension 22, and an outer lens 12 from the inside with respect to a lamp body 18. An aluminum reflective film is formed on the surface of the extension 22 through deposition to form a reflector 26 which reflects light from the light source. That is, the extension 22 serves as a so-called extension reflector. When these components are assembled, a lamp chamber is defined between the lamp body 18 and the outer lens 12, and the light source unit 20 and the reflector 26 are accommodated within the lamp chamber.

An attachment hole 30 is formed at the center of the lamp body 18, through which the turn lamp 14 (see, e.g., FIG. 1) is inserted and fixed. A plurality of screw holes 32 is formed around the attachment hole 30 to fix the light source unit 20.

The light source unit 20 includes a U-shaped base 34 which forms the main body of the light source unit 20, and a plurality of printed circuit boards 36, 38, 40 and 42 fixed to the base 34. In the present exemplary embodiment, as for the printed circuit boards 36 to 42, a rigid substrate (brittle substrate) which is made of a resin and is more inexpensive than a flexible printed circuit board (hereinafter, referred to as a "FPC") is used. A plurality of LEDs 44 is mounted as light sources on the printed circuit boards 36 to 42, respectively. A control circuit is mounted on the printed circuit board 42 to perform a lighting control of the LEDs 44 provided on the printed circuit boards 36 to 40. A power is supplied to the printed circuit boards from a power supply circuit (not illustrated) provided at the rear side of the lamp body 18. Details of the light source unit 20 will be described later.

The extension 22 is formed in a shape complementary to each of the lamp body 18 and the outer lens 12. An accommodating portion 46 is defined in the center of the extension 22 to accommodate the turn lamp 14. An insertion hole 48 is formed in the center of the accommodating portion 46, through which the turn lamp 14 is inserted. The reflector 26 is formed around the accommodating portion 46, and a plurality of insertion holes 50 is formed through the top wall, the bottom wall, and the side wall of the reflector 26, respectively, to expose the LEDs 44. The extension 22 includes a U-shaped recess on the rear surface side thereof so that the light source unit 20 is fitted along the periphery of the extension 22.

The outer lens 12 is made of a light transmitting resin material, and is assembled with the lamp body 18 with the light source unit 20 and the extension 22 being interposed therebetween.

Figures 3A, 3B:
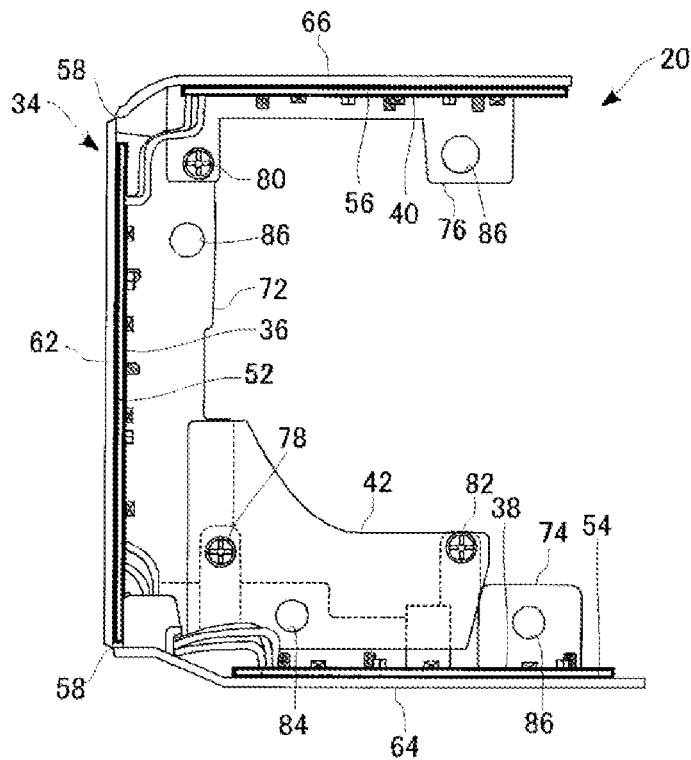
FIGS. 3A and 3B are views illustrating a configuration and an attachment structure of a light source unit.

FIGS. 3A and 3B are views illustrating a configuration and an attachment structure of the light source unit 20. FIG. 3A illustrates the structure of the light source unit 20 in an assembled state, and FIG. 3B illustrates the structure of the light source unit 20 attached to the extension 22. As illustrated in FIG. 3A, the light source unit 20 includes a U-shaped base 34 having three board mounting surfaces 52, 54, and 56 on the inner surface thereof, and the three printed circuit boards 36, 38 and 40 fixed to the board mounting surfaces, respectively.

The base 34 is formed by folding a single plate-like member formed by injection molding of a resin material, at two locations. Each folded portion is a hinge 58 constituted by a thin portion formed during the injection molding, and constitutes an "axis" as a boundary of folding. The base 34 is divided into a first base portion 62 at the center, a second base portion 64 formed to be continued to one end of the first base portion 62, and a third base portion 66 formed to be continued to the other end of the first base portion 62, by the two hinges 58. As illustrated, the board mounting surfaces are formed on the inner surface which is folded in the U-shape. That is, on the first base portion 62, the board mounting surface 52 is formed, and the printed circuit board 36 is fixed to the board mounting surface 52. On the second base portion 64, the board mounting surface 54 is formed, and the printed circuit board 38 is fixed to the board mounting surface 54. On the third base portion 66, the board mounting surface 56 is formed, and the printed circuit board 40 is fixed to the board mounting surface 56.

A plate-like attachment portion for fixing adjacent base portions is erected on each base portion perpendicularly to the board mounting surface. That is, an attachment portion 72 is erected on the first base portion 62, an attachment portion 74 is erected on the second base portion 64, and an attachment portion 76 is erected on the third base portion 66. An end portion of the attachment portion 72 at the second base portion 64 side and an end portion of the attachment portion 74 at the first base portion 62 are fastened by a screw 78 so that the first base portion 62 and the second base portion 64 are fixed at a right angle. An end portion of the attachment portion 72 at the third base portion 66 side and an end portion of the attachment portion 76 at the first base portion 62 are fastened by a screw 80 so that the first base portion 62 and the third base portion 66 are fixed at a right angle. Accordingly, the U-shaped base 34 is formed.

The printed circuit board 42 is fixed to the attachment portion 72 and the attachment portion 74 through the screws 78 and 82. That is, the printed circuit board 42 is fixed to be perpendicular to each of the first base portion 62 and the second base portion 64. In the present exemplary embodiment, a control circuit is mounted at the rear surface side of the printed circuit board 42, that is, a surface opposite to the surfaces of the printed circuit boards 36 to 40 which face the board mounting surfaces. This is to make the LEDs 44 hard to be affected by the heat generated from the control circuit in consideration of the fact that the LEDs 44 are relatively sensitive to heat.

Meanwhile, an insertion hole 84 is formed through overlapping portions of the printed circuit board 42 and the attachment portion 74. An insertion hole 86 is individually formed in each of the attachment portion 72, 74 and 76. In the insertion holes 84 and 86, screws are inserted to be screwed into the screw holes 32 described above when the light source unit 20 is assembled with the lamp body 18.

After the light source unit 20 assembled as described above is assembled with the lamp body 18, the extension 22 is assembled as illustrated in FIG. 3B. Since the U-shaped recess is formed on the rear surface of the extension 22 along the periphery of the extension 22, the base 34 is inserted into the recess so that the light source unit 20 is assembled with the extension 22. Since the plurality of insertion holes 50 described above is formed on the inner top, bottom, and side walls of the recess of the extension 22, the LEDs 44 are exposed through the insertion holes 50. That is, the LEDs 44 on the printed circuit board 36 are exposed through the insertion holes 50 on the side wall, the LEDs 44 on the printed circuit board 38 are exposed through the insertion holes 50 on the bottom wall, and the LEDs 44 on the printed circuit board 40 are exposed through the insertion holes 50 on the top wall. When the respective LEDs 44 exposed as described above emit light, the emitted light is reflected forwardly by the reflector 26 so that the LEDs 44 serve as the tail/stop lamp 16.

Meanwhile, since the base 34 is configured in the U-shape to be assembled with the periphery of the extension 22 as described above, a mounting space for the turn lamp 14 to be provided separately from the light source unit 20 is formed in a space surrounded by the base 34.

FIGS. 4A and 4B are views illustrating an assembly structure of the base 34 with the printed circuit boards 36 to 40. FIG. 4A is a plan view and FIG. 4B is a front view. Meanwhile, in the drawings, the base 34 is illustrated in a developed state before folding. As illustrated in FIGS. 4A and 4B, the first base portion 62 includes front and rear side edges formed in slightly arcuate shapes. The attachment portion 72 is erected on the periphery of the rear surface side. The printed circuit board 36 has a shape conforming to the board mounting surface 52 of the first base portion 62, and five LEDs 44 are arranged on the top surface of the printed circuit board 36, that is, the surface of the printed circuit board 36 opposite to the board mounting surface 52. The LEDs 44 are arranged at substantially regular intervals in the longitudinal direction of the printed circuit board 36. The printed circuit board 36 and the first base portion 62 are fixed through three joining parts 88.

In the same manner, the second base portion 64 includes front and rear side edges formed in arcuate shapes. The attachment portion 74 is erected on the end edge of the rear surface side. The printed circuit board 38 has a shape conforming to the board mounting surface 54 of the second base portion 64, and three LEDs 44 are arranged on the top surface of the printed circuit board 38, that is, the surface of the printed circuit board 38 opposite to the board mounting surface 54. The LEDs 44 are arranged at substantially regular intervals in the longitudinal direction of the printed circuit board 38. The printed circuit board 38 and the second base portion 64 are fixed through three joining parts 88.

The third base portion 66 includes front and rear side edges formed in arcuate shapes. The attachment portion 76 is erected on the end edge of the rear surface side. The printed circuit board 40 has a shape conforming to the board mounting surface 56 of the third base portion 66, and three LEDs 44 are arranged on the top surface of the printed circuit board 40, that is, the surface of the printed circuit board 40 opposite to the board mounting surface 56. The LEDs 44 are arranged at substantially regular intervals in the longitudinal direction of the printed circuit board 40. The printed circuit board 40 and the third base portion 66 are fixed through three joining parts 88.

The wiring of the printed circuit board 36 and the wiring of the printed circuit board 38 are connected to each other through a plurality of lead wires 90. The wiring of the printed circuit board 36 and the wiring of the printed circuit board 40 are connected to each other through a plurality of lead wires 92. The wiring of the printed circuit board 38 is connected with lead wires 93 which are in turn connected with the wiring of the printed circuit board 42. Through this configuration, a power may be supplied to each printed circuit board, and a lighting control of LEDs 44 may be performed.

Figure 6A:
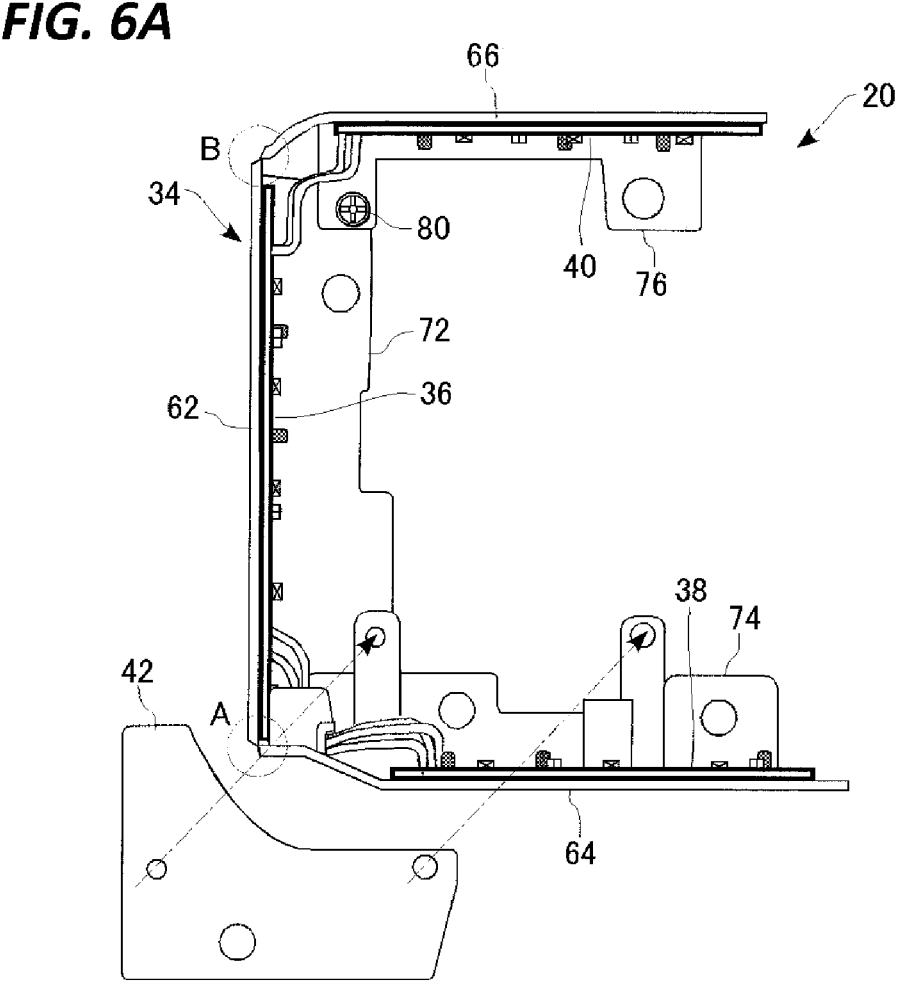
FIGS. 6A to 6C are explanatory views illustrating a method of assembling a light source unit.
Figure 6B:
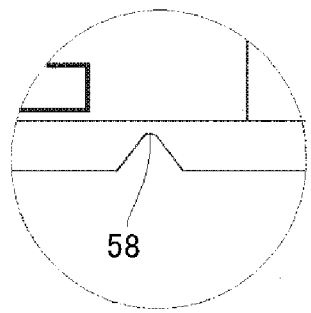
Figure 6C:
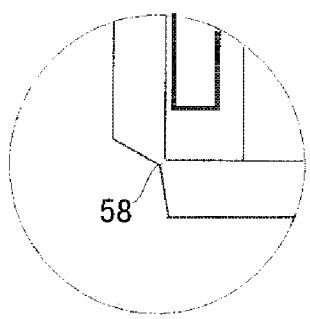

FIGS. 5A and 5B, and FIGS. 6A to 6C are explanatory views illustrating a method of assembling the light source unit 20. FIGS. 5A, 5B and 6A illustrate a process of assembling the light source unit 20. FIG. 6B illustrates part A of FIG. 4B in an enlarged scale, and FIG. 6C illustrates part A of FIG. 6A in an enlarged scale.

In the assembly of the light source unit 20, as illustrated in FIG. 5A, first, in a state where the base 34 is developed before folding, the printed circuit boards 36, 38, and 40 are mounted on the base portions 62, 64, and 66. As illustrated, positioning fitting projections 94 and 96 are formed on the board mounting surfaces 52, 54 and 56 of the base portions 62, 64, and 66, and positioning fitting holes 100 and 102 are formed at corresponding locations of the printed circuit boards 36, 38 and 40. Thus, the assembly is performed by fitting the fitting projections 94 and 96 to the fitting holes 100 and 102 (see, e.g., dotted arrows). Meanwhile, the fitting projections 94 and the fitting holes 100 have complementary circular shapes in cross-section, and are subjected to thermal caulking to be described later. Meanwhile, the fitting projections 96 and the fitting holes 102 have complementary square shapes in cross-section, and have only a positioning function.

When the assembly is completed, as illustrated in FIG. 5B, the thermal caulking is performed on the engaged portions between the fitting projections 94 and the fitting holes 100. The thermal caulking is performed using a conventionally known dedicated device. As illustrated, since the base 34 is developed so that all the top surfaces of the printed circuit boards 36, 38 and 40 are directed upwards, a tool for thermal caulking may be easily approached. Depending on the specifications of the tool, all the joining parts 88 may be subjected to the thermal caulking at once (in one step). Accordingly, the work efficiency may be improved.

After the thermal caulking is completed, as indicated by the thick arrows in the drawing, the base 34 is folded using the hinges 58. As illustrated in FIG. 6A, in a state where the base 34 is formed in the U shape, the attachment portion 72 and the attachment portion 76 are fixed by the screw 80. Then, the printed circuit board 42 is assembled with the attachment portion 74. That is, as illustrated in FIG. 3A, the printed circuit board 42 is fixed by the screws 78 and 82. In this manner, the assembly of the light source unit 20 is completed.

Meanwhile, the folding of the base 34 may be easily performed since one side (outside) of the hinge 58 is opened as illustrated in FIGS. 6B and 6C. Such a function of the hinge 58 also applies to part B illustrated in FIGS. 4B and 6A.

As described above, in the present exemplary embodiment, in the process of manufacturing the light source unit 20, the relative angles among the board mounting surfaces 52, 54 and 56 may be varied only by performing a simple operation of folding the base 34 around the hinges 58. Therefore, the optical axis directions of the plurality of LEDs 44 among the printed circuit boards may be different from each other only by attaching the plurality of printed circuit boards 36, 38 and 40 to the plurality of board mounting surfaces 52, 54 and 56, respectively.

In the folding, the positional relationship of each of the board mounting surfaces 52, 54 and 56 with respect to the hinge 58 is autonomously maintained, and thus, the workability is remarkably improved as compared to a case where a board mounting surface is separately provided. As in the present exemplary embodiment, when the arrangement of the LEDs 44 in the plurality of board mounting surfaces 52, 54 and 56, and the positions and directions of the hinges 58 are determined in advance, the positional relationship of the plurality of LEDs 44 may be set with high accuracy when the base 34 is folded. As a result, in the vehicular lamp 10, the light emitted from each of the plurality of LEDs 44 may be reflected by the reflector 26 so that the designed function may be achieved.

The present disclosure has been described with reference to the exemplary embodiment. However, without being limited to the above described exemplary embodiment, the present disclosure includes a proper combination or replacement of components of the exemplary embodiment. Also, based on the knowledge of those skilled in the art, the combination or sequence in the exemplary embodiment may be properly rearranged or various modifications such as changes in design may be made in the exemplary embodiment. Also, such modifications may also be included in the scope of the present disclosure.

In the exemplary embodiment described above, the base 34 is divided into three base portions, and the printed circuit boards 36 to 40 are mounted in the base portions, respectively. That is, in the configuration described above, the three boards equipped with the LEDs 44 are mounted on the base portions, respectively. In the modified exemplary embodiment, the base 34 may be divided into two base portions by one hinge 58, and two boards equipped with light sources may be mounted on the base portions, respectively. Otherwise, the base 34 may be divided into four base portions by three hinges 58, and four boards equipped with light sources may be mounted on the base portions, respectively.

In the exemplary embodiment described above, the hinge 58 is constituted by the thin portion of the base 34 which is formed by integrally molding a resin material, and serves as an axis during folding. In the modified exemplary embodiment, a plurality of base portions may be rotatably connected to each other by hinges as separate members. In this case, each of the hinges may be a metallic hinge. However, when the production cost is taken into consideration, the hinges may be fabricated simultaneously with the molding of the base as in the exemplary embodiment described above.

In the exemplary embodiment described above, the printed circuit boards 36 to 42 are constituted by resin rigid substrates, but may be constituted by FPCs. However, when, for example, the component cost is taken into consideration, the inexpensive substrate may be employed as in the exemplary embodiment described above.

In the exemplary embodiment described above, as the light source of the light source unit 20, the LEDs 44 are exemplified, but, for example, laser diodes, discharge lamp bulbs, incandescent bulbs, and halogen bulbs may be used. However, in view of the structure, a small light source may be employed which can be mounted in a plurality of locations of the printed circuit boards 36 to 40.

Although not described in the exemplary embodiment described above, a fitting structure may be provided between the attachment portion 72 and the attachment portion 74 illustrated in FIGS. 6A to 6C to position both the attachment portion 72 and the attachment portion 74. For example, a fitting projection may be formed on one attachment portion, and a fitting hole or a fitting recess may be formed on the other attachment portion, so that they are fitted to each other to position both attachment portions. The same fitting structure may be provided between the attachment portion 72 and the attachment portion 76. Through this configuration, it is possible to perform, for example, screw-joining in a state where both the attachment portions are stably maintained. Otherwise, both portions may be joined together by only the fitting structure, instead of, for example, the screw-joining In the exemplary embodiment described above, the outer lens 12 is assembled with respect to the outside of the extension 22. Also, an inner lens may be disposed between the extension 22 and the outer lens 12.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A light source unit that is built in a vehicular lamp, the light source unit comprising:
   a base including a plurality of board mounting surfaces, the base being formed to be foldable around a hinge formed between each two adjacent board mounting surfaces as a boundary; and
   a plurality of printed circuit boards attached to the plurality of board mounting surfaces, respectively, each printed circuit board having a light source with an optical axis mounted on a surface opposite to the board mounting surface thereof,
   wherein a first optical axis of a first light source on a first printed circuit board is not parallel with a second optical axis of a second light source on a second printed circuit board which is adjacent to the first printed circuit board and the second optical axis of the second light source is not parallel with a third optical axis of a third light source on a third printed circuit board which is adjacent to the second printed circuit board,
   wherein the base comprises a U-shaped part comprising three board mounting surfaces, the three board mounting surfaces are respectively attached to three printed circuit boards including the first, the second and the third printed circuit boards, the U-shaped part constitutes a concave portion, and the first light source, the second light source and the third light source illuminate light into the concave portion, and the first optical axis is directed toward the third light source and the third optical axis is directed toward the first light source.

2. The light source unit of claim 1, wherein the plurality of board mounting surfaces is formed on one surface of the base, and
   the plurality of printed circuit boards is fixed to the board mounting surfaces, respectively, which correspond to the plurality of printed circuit boards in a state where the base is developed before folding.

3. The light source unit of claim 1, wherein the base is obtained by integrally molding a resin material, and
   the hinge is formed of a thin portion formed in the base.

4. The light source unit of claim 2, wherein the base is obtained by integrally molding a resin material, and
   the hinge is formed of a thin portion formed in the base.

5. A vehicular lamp comprising:
   a light source unit equipped with a plurality of light sources having different optical axes; and
   a reflector configured to reflect light emitted from the plurality of light sources,
   wherein the light source unit includes:
      a base including a plurality of board mounting surfaces, the base being formed to be foldable around a hinge formed between each two adjacent board mounting surfaces as a boundary; and
      a plurality of printed circuit boards attached to the plurality of board mounting surfaces, respectively, each printed circuit board having a light source mounted on a surface opposite to the board mounting surface thereof,
   wherein a first optical axis of a first light source on a first printed circuit board is not parallel with a second optical axis of a second light source on a second printed circuit board which is adjacent to the first printed circuit board and the second optical axis of the second light source is not parallel with a third optical axis of a third light source on a third printed circuit board which is adjacent to the second printed circuit board,
   wherein the base comprises a U-shaped part comprising three board mounting surfaces, the three board mounting surfaces are respectively attached to three printed circuit boards including the first, the second and the third printed circuit boards, the U-shaped part constitutes a concave portion, and the first light source, the second light source and the third light source illuminate light into the concave portion, and the first optical axis is directed toward the third light source and the third optical axis is directed toward the first light source.

6. The vehicular lamp of claim 5, wherein the light source unit and the reflector are accommodated in a lamp chamber defined between a lamp body and an outer lens, and
   the base is disposed along a periphery of the lamp chamber in a state where the base is folded.

7. The vehicular lamp of claim 6, wherein a mounting space of a lamp to be provided separately from the light source unit is formed in a space surrounded by the base.

8. The light source unit of claim 1, wherein at least three of the plurality of printed circuit boards are attached to the three board mounting surfaces, respectively.

9. The light source unit of claim 1, wherein each of the three board mounting surfaces of the U-shaped part is flat.

10. The light source unit of claim 1, wherein the plurality of printed circuit boards are connected by a plurality of lead wires which are physically separate from the base.

11. The vehicular lamp of claim 5, wherein at least three of the plurality of printed circuit boards are attached to the three board mounting surfaces, respectively.

12. The vehicular lamp of claim 5, wherein each of the three board mounting surfaces of the U-shaped part is flat.

13. The vehicular lamp of claim 5, wherein the plurality of printed circuit boards are connected by a plurality of lead wires which are physically separate from the base.

\* \* \* \* \*